Oct. 24, 1939. P. KLOTSCH 2,176,971
LAND VEHICLE
Filed April 1, 1937 2 Sheets-Sheet 1

INVENTOR
Paul Klotsch.
BY
ATTORNEYS.

Oct. 24, 1939.　　　P. KLOTSCH　　　2,176,971
LAND VEHICLE
Filed April 1, 1937　　　2 Sheets-Sheet 2
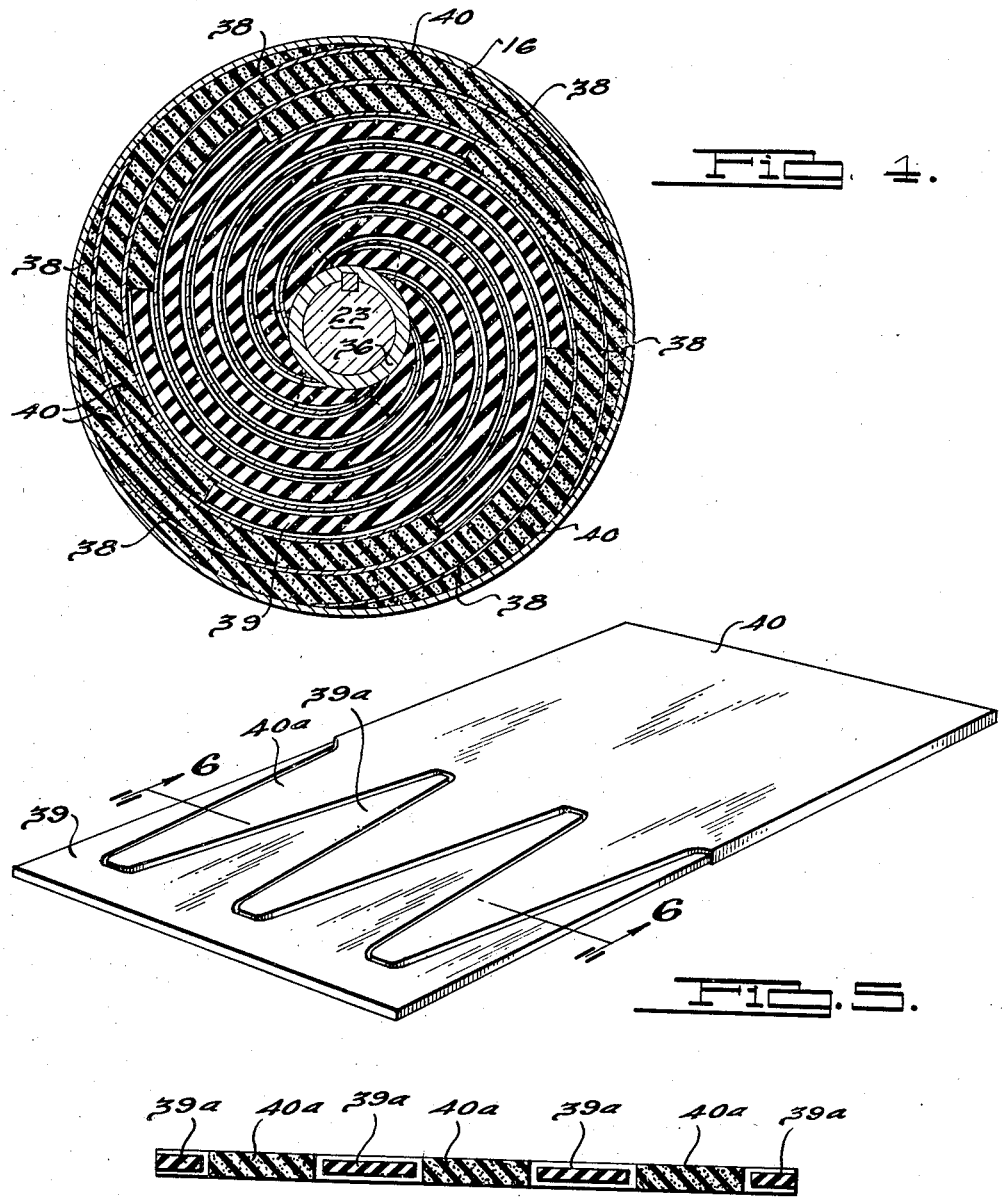

Patented Oct. 24, 1939

2,176,971

UNITED STATES PATENT OFFICE 2,176,971

LAND VEHICLE

Paul Klotsch, Detroit, Mich., assignor to Briggs Manufacturing Company, Detroit, Mich., a corporation of Michigan Application April 1, 1937, Serial No. 134,213

11 Claims. (Cl. 267—21)

This invention relates to land vehicles and more particularly to wheel suspensions therefor.

One of the objects of the present invention is to provide an improved wheel suspension for a land vehicle, in which the resiliency of the wheel suspension is effected by the provision of members made of a highly resilient material, such as rubber, which members are distorted on the upward movement of the wheels.

Another object of the invention is to provide an improved wheel suspension of the foregoing character in which the rubber members are subjected chiefly to compression and/or shear stresses.

Still another object of the invention is to provide an improved wheel suspension for a motor vehicle, in which the resilient means employed comprise members made of materials having different resilient characteristics and, particularly, different rates of deflection and frequencies of oscillation, thus effecting a highly desirable self-dampening effect in said resilient means.

A further object of the invention is to provide an improved wheel suspension for a motor vehicle, which inherently resists not only the compression but the rebound as well.

It is an added object of the invention to provide an improved structure of the above character which is relatively simple in construction and is dependable in operation, and which is relatively cheap to manufacture and to service.

Other objects of this invention will appear in the following description and appended claims, reference being had to the accompanying drawings forming a part of this specification wherein like reference characters designate corresponding parts in the several views.

Fig. 4 is a transverse sectional view of the structure shown in Fig. 3, section being taken on the line 4—4 of Fig. 3.

Fig. 5 is a perspective view of two mating rubber plates.

Fig. 6 is a transverse sectional view of the rubber plates shown in Fig. 5, section being taken on the line 6—6 of said figure.

Figures 1, 2, 3:
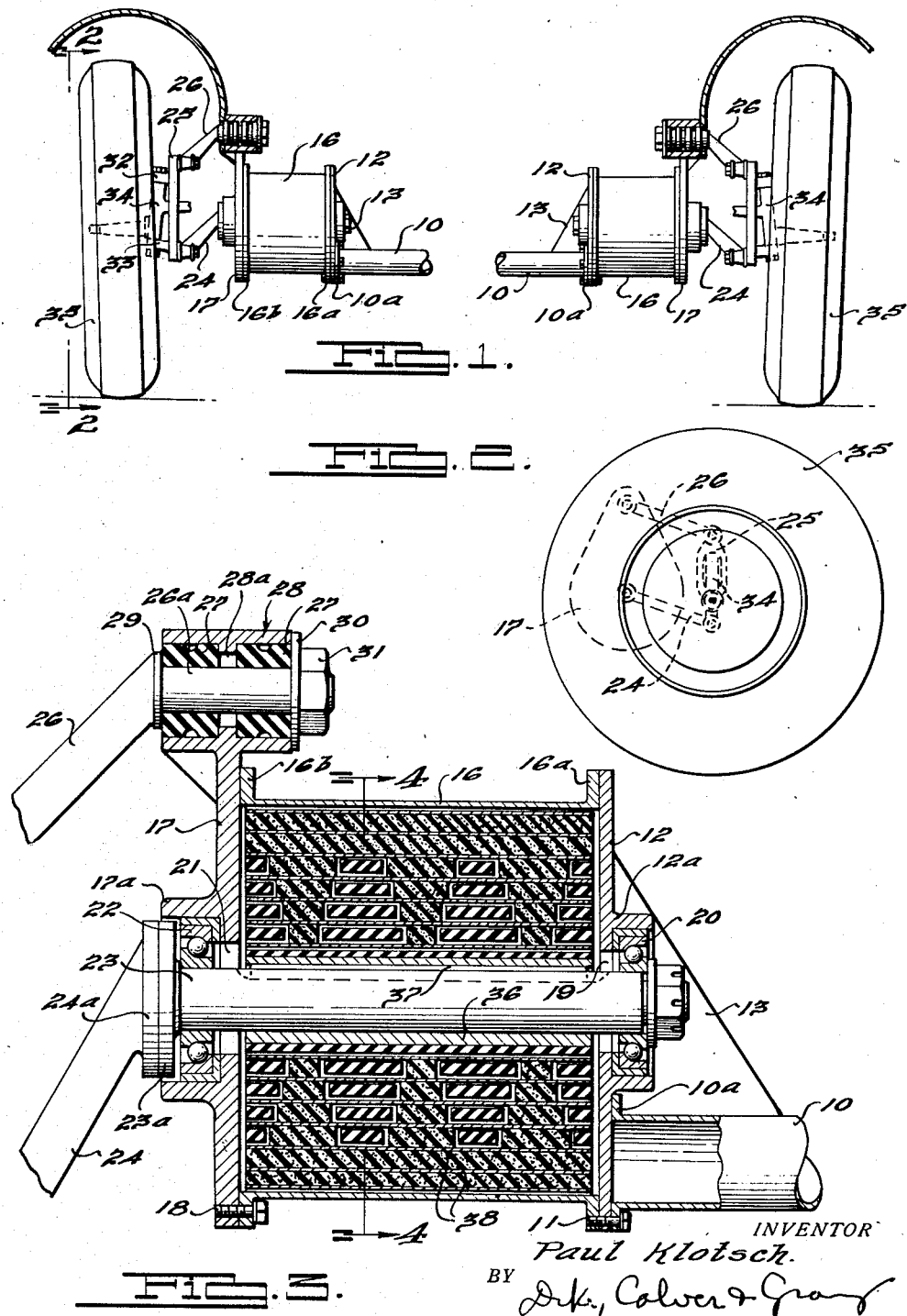
Fig. 1 is a fragmentary front view of a vehicle, partly in section, showing one embodiment of the invention.
Fig. 2 is a side view taken on the line 2—2 of Fig. 1 in the direction of the arrows.
Fig. 3 is a longitudinal sectional view showing the arrangement and the details of construction of the torque resisting assemblies.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a part of a motor vehicle provided with a front wheel suspension embodying the present invention. Referring to Fig. 1, the illustrated structure includes a rigid tubular member 10 extending transversely of the vehicle and secured to the body structure thereof. The extremities of said tubular member 10 are provided with flanges 10a to which are secured by a plurality of screws 11 two back plates 12, one at each extremity of said tubular member 10. Angle brackets 13 secured in any convenient manner to both the tube 10 and the plates 12 add to the rigidity of connection. The plates 12 are of a circular form and the peripheral edges of each thereof are adapted to bear against a continuous circular flange 16a of a drum 16 extending outwardly from said tubular member 10. The outer end of each drum 16 is provided with an annular, outwardly extending flange 16b which is adapted to bear against a cover plate 17 to which it is detachably secured in a convenient manner, such as by screws 18. Thus, the tubular member 10, the drums 16 with their cover plates 12 and 17 are rigidly secured together and constitute a single load carrying unit secured to the vehicle structure.

It should be noted at this point that the construction of the wheel suspension is similar in the present embodiment at each of the front wheels and, therefore, only one of them need be described in detail. The following description refers to the left hand side wheel (as it appears in the drawings), it being understood that the structure effecting suspension of the right hand wheel is similar, and that equivalent suspension means may, as desired, be provided for the rear wheels of the vehicle.

The back plate 12 is provided with an aperture 19 which is surrounded by an annular flange 12a extending toward the center of the vehicle and forming a nest into which is pressed a thrust resisting ball bearing 20. A similar aperture 21 is provided in the front cover plate 17 and the same is surrounded by an outwardly extending annular flange 17a forming a nest for a second thrust resisting ball bearing 22. Ball bearings 20 and 22 serve for journalling therein a shaft 23, which shaft is provided at its outward extremity with a flange 23a. To said flange 23a is bolted or otherwise secured the flange 24a of a swinging wheel carrying arm 24, the opposite end 24b thereof being hingedly connected to a steering head 25. The upper end of said steering head 25 is hingedly connected to a guiding arm 26 which is anchored by its end 26a to the front cover plate 17, rubber bushings 27 being provided in the cylindrical nest 28, which nest is preferably integrally formed with the plate 17. When assembled, one of said rubber bushings 27 is compressed between the shoulder 29 provided on the guiding arm 26 and the annular rib or bead 28a provided in said nest 28, while the other of said bushings is pressed toward said bead 28a by a metal washer 30 held in place by an adjusting nut 31 engaging the threaded portion of the arm end. By the above described means a resilient connection of the guiding arm 26 to the cover plate 17 is effected, the continuous metal path being interrupted by said rubber bushings 27.

The steering head 25 is provided with lugs 32 and 33 which are adapted, in the manner well known in the art, to carry a steering knuckle 34, which knuckle in turn carries a wheel 35 and is connected by means of a suitable steering linkage (not shown) to the steering column of the vehicle.

With the above description in view it can be seen from an examination of the drawings that as the wheel 35 moves up, the swinging arm 24 is turned and the shaft 23 is rotated through a certain angle relatively to the fixed drum 16. If such a rotation of the shaft 23 with respect to the drum 16 were resiliently resisted, the resilience of suspension of the wheel 35 would be thereby effected.

In accordance with the present invention means are provided for such resilient resistance to the rotation of the shaft 23 relatively to the drum 16. In the present embodiment of the invention said means comprise a sleeve 36 mounted on the shaft 23 and restrained to rotate therewith in any suitable manner such as by means of a key 37. To said sleeve 36 is welded or otherwise secured by their edges 38a a plurality of spirally wound sheet springs 38, the opposite extremities whereof are welded or othewrise secured to the inside surfaces of the drum 16. As is clearly shown in Fig. 3, the width of said springs 38 is slightly less than the length of the drum 16 in order to provide the proper clearance. I prefer to make said springs 38 of sheet spring steel, employing six of such springs in each drum. It can be appreciated in view of the foregoing that as the wheel 35 moves up and the shaft 23 rotates in response thereto, the springs 38 are wound on the shaft 23 and resist such winding up because of their resiliency. When the shaft 23 rotates and the springs 38 are wound thereon as mentioned, the clearance spaces between said individual springs 38 tend to decrease, the same being true substantially for the entire clearance spaces with the exception of those portions thereof which are adjacent to the drum 16. The above action of the springs 38 is utilized for the purpose of providing means which are put substantially in compression by rotation of the shaft 23.

In the clearance spaces between said springs 38 and adjacent the sleeve 36 there is provided a corresponding plurality of comparatively hard solid rubber plates or slabs 39 extending in the clearance spaces between said springs and following the curvature thereof toward the drum 16. In the same clearance spaces and adjacent the drum 16 there is provided a corresponding plurality of rubber plates or slabs 40 of softer rubber composition, such as sponge rubber or other suitable rubber composition. The slabs 39 and 40 are so constructed that the area of the slabs 39 diminishes toward the drum 16 and away from the sleeve 36, while the area of the softer rubber plates 40 diminishes in the opposite direction, namely toward the sleeve 36 and away from the drum 16. The diminishing of the respective areas of said rubber plates as specified, is effected by providing along the mutually adjacent edges of said plates of a plurality of flat tapering fingers 39a and 40a, said fingers meshing as shown in Fig. 5, a certain amount of clearance being provided between them. It is important to note that a certain amount of clearance is also provided between the relatively hard rubber plates 39 and the steel springs 38, while the softer rubber plates 40 substantially fill the clearance spaces between the springs 38 in the places of their respective locations.

By tapering the fingers 40a toward the region where compression forces are more intensive, the unit volume of rubber per cubic unit of clearance space available therefor is decreased, and therefore more room is provided for the flow of the rubber mass subjected to greater compression forces. By virtue of such a construction, the entire rubber mass of the slabs or plates 40, when the same are compressed by springs 38, is in a condition of substantially uniform compression within its highly resilient range, and occurrence of the objectionable condition of liquid incompressibility in the fingers 40a is prevented.

It will be understood that the word rubber as employed in the specification means any highly resilient material such as rubber, various rubber imitations and the like.

The relative sizes of the springs 38 and of the rubber slabs 39 and 40 are so selected that compression of the rubber begins substantially at the point where dynamic loads are applied to the shaft 23 in addition to the static load resisted substantially by the resiliency of the springs 38. As the shaft 23 is rotated because of the movements of the wheel 35, and the springs 38 move together because of their winding upon the sleeve 36, compression and partly shearing strains are imposed on the rubber slabs and said strains are resiliently resisted thereby. Compression of the softer rubber plates 40 is permitted by the tendency of the rubber mass of said softer plates to flow when compressed toward the drum 16. If the softer rubber plates 40 are made of sponged rubber, compression of such plates is facilitated by the presence of cavities in the masses thereof, and their compression may continue until said cavities are substantially eliminated or the air contained in such cavities is compressed to a point where it resists with an equal reaction the external pressure exerted by the springs upon said plates.

As winding up of the springs 38 continues, said springs come into contact with the relatively hard rubber plates 39, whereupon further compression of said plates 39 may take place only if there is enough space for the rubber to flow. It should be noted in this connection that rubber in compression exhibits characteristics similar to those of a liquid and is substantially incompressible. In other words, unless there is sufficient room for the rubber to flow or bulge out somewhere, further compression of the rubber stops and continues only in a negligible degree. Thus, when the clearance spaces between the solid or harder rubber plates 39 and springs 38 are eliminated, as by compression of the softer rubber 40, and the clearance spaces between the fingers 39a and 40a are filled by the flowing or bulging out of the rubber 40, further rotation of the sleeve 36 substantially ceases.

It should be noted that in places where rubber plates are in contact with the springs 38 a certain amount of shearing distortion of the rubber plates also occurs, and the resistance of the rubber plates to said shearing distortion contributes to the total resistance offered by said rubber plates to the rotation of the shaft 23.

It is an important feature of the present invention that objectionable oscillation common to the resilient means is largely eliminated in the present structure. It can be easily appreciated that steel springs 38 as a unit have a certain fixed rate of oscillation. Similarly, the rubber plates have a certain and different rate. Therefore, as the springs 38 and the rubber plates 39 and 40 are compressed by a sudden upward movement of the wheel 35, the succeeding oscillations of the springs and of the rubber plates are of different frequencies, and therefore, they oppose and destroy each other, thereby producing a very desirable self-dampening effect.

I claim:

1. In a motor vehicle, a fixed drum, a rotatable metal sleeve arranged within said drum concentrically therewith, there being a separating space between said drum and said sleeve; a plurality of flat, spirally wound springs arranged in said space, each of them being secured by its respective extremities to said sleeve and said drum; a plurality of relatively hard rubber slabs disposed between said springs adjacent to said metal sleeve; and a plurality of softer rubber slabs disposed between said springs adjacent to said fixed drum, whereby rotation of said sleeve is resiliently resisted substantially by compression and shear resistance of said slabs, said relatively hard rubber slab providing a resilient stop for said rotating sleeve.

2. In a motor vehicle, a fixed drum, a rotatable metal sleeve arranged within said drum concentrically therewith, there being a separating space between said drum and said sleeve; a plurality of flat, spirally wound springs arranged in said space, each of them being secured by its respective extremities to said sleeve and said drum; a plurality of solid rubber slabs disposed between said springs adjacent to said metal sleeve, the area of said slabs decreasing away from said sleeve; and a plurality of sponged rubber slabs disposed between said springs adjacent to said fixed drum, the area of said sponged rubber slabs decreasing toward said sleeve.

3. In a motor vehicle, a fixed drum, a rotatable metal sleeve arranged within said drum concentrically therewith, there being a separating space between said drum and said sleeve; a plurality of flat, spirally wound springs arranged in said space, each of them being secured by its respective extremities to said sleeve and said drum; a plurality of solid rubber plates disposed between said springs adjacent said metal sleeve, the edges of said plates opposite the edge adjacent to said sleeve being provided with fingers of diminishing areas, whereby the area of said plates is caused to decrease away from said sleeve; and a plurality of sponged rubber plates disposed between said springs adjacent to said fixed drum, the edge of said sponged rubber plates adjacent said solid rubber plates being provided with fingers of diminishing area adapted to be disposed within the recesses between the fingers of said solid rubber plates, whereby the area of said sponged rubber plates decreases toward said sleeve.

4. In a motor vehicle, a stationary drum; an oscillatable wheel-carrying arm; a rotatable shaft secured to said arm and extending axially through said drum; means for journalling said shaft in the drum; a metal sleeve mounted on said shaft and rotatable therewith, there being a separating space between said drum and said sleeve; a plurality of flat, spirally wound springs arranged in said space, each of them being secured by its respective extremities to said sleeve and said drum; a plurality of solid rubber slabs disposed between said springs adjacent to said metal sleeve; and a plurality of sponged rubber slabs disposed between said springs adjacent to said fixed drum, whereby rotation of said sleeve is resiliently resisted substantially by compression and shear resistance of said slabs, said solid rubber slab providing a resilient stop for said rotating sleeve.

5. In a motor vehicle, a stationary drum; an oscillatable wheel-carrying arm; a rotatable shaft secured to said arm and extending axially through said drum; means for journalling said shaft in the drum; a metal sleeve mounted on said shaft and rotatable therewith, there being a separating space between said drum and said sleeve; a plurality of flat, spirally wound springs arranged in said space, each of them being secured by its respective extremities to said sleeve and said drum, said spring adapted to carry the static load of the vehicle structure; a plurality of solid rubber slabs disposed between said springs adjacent to said metal sleeve; and a plurality of sponged rubber slabs disposed between said springs adjacent to said fixed drum, whereby rotation of said sleeve is resiliently resisted substantially by compression and shear resistance of said slabs, said solid rubber slab providing a resilient stop for said rotating sleeve.

6. In a vehicle, a vertically oscillatable wheel carrying arm, a fixed support, a rotatable shaft journalled in the support and secured to said arm, a spirally arranged resilient rubber strip of longitudinally variable compressibility interposed between the shaft and support, and means secured to the shaft and support for compressing said rubber strip upon rotation of the shaft relative to the support.

7. In a vehicle, a fixed support, a wheel carrying shaft rotatable relatively to said support, a plurality of nested spirally arranged resilient rubber strips interposed between the support and shaft, and means for compressing said strips upon rotation of the shaft.

8. In a vehicle, a fixed support, a wheel carrying shaft rotatable relatively to said support, a plurality of nested spirally arranged resilient rubber strips interposed between the support and shaft, means for compressing said strips upon rotation of the shaft, and means for progressively varying the degree of compression of at least one of said strips longitudinally thereof.

9. In a vehicle wheel suspension, a fixed support, a wheel carrying shaft rotatable relatively to the support, a spirally arranged resilient rubber strip interposed between the shaft and support, and means for compressing said strip upon rotation of the shaft, said suspension being constructed and operable to produce varying resistance to the rotation of said shaft within areas of said strip.

10. In a vehicle wheel suspension, a fixed support, a wheel carrying shaft rotatable relatively to the support, a spirally arranged resilient rubber strip interposed between the shaft and support, means for compressing said strip upon rotation of the shaft, and means cooperable with said last named means to compress said strip a less amount in one area thereof than in another.

11. In a vehicle, a fixed support, a wheel carrying shaft rotatable relatively to said support, a plurality of nested spirally arranged resilient rubber strips interposed between the support and shaft, and means for compressing said strips upon rotation of the shaft, said rubber strips having the volume of rubber per unit of their length decrease toward the center of the shaft.

PAUL KLOTSCH.